March 4, 1958 W. FERRIS 2,825,241
PISTON AND PISTON ROD ASSEMBLIES
Filed Dec. 31, 1952 2 Sheets-Sheet 1

INVENTOR
WALTER FERRIS
BY *Wesley P. Murrill*
ATTORNEY

March 4, 1958 W. FERRIS 2,825,241
PISTON AND PISTON ROD ASSEMBLIES
Filed Dec. 31, 1952 2 Sheets-Sheet 2
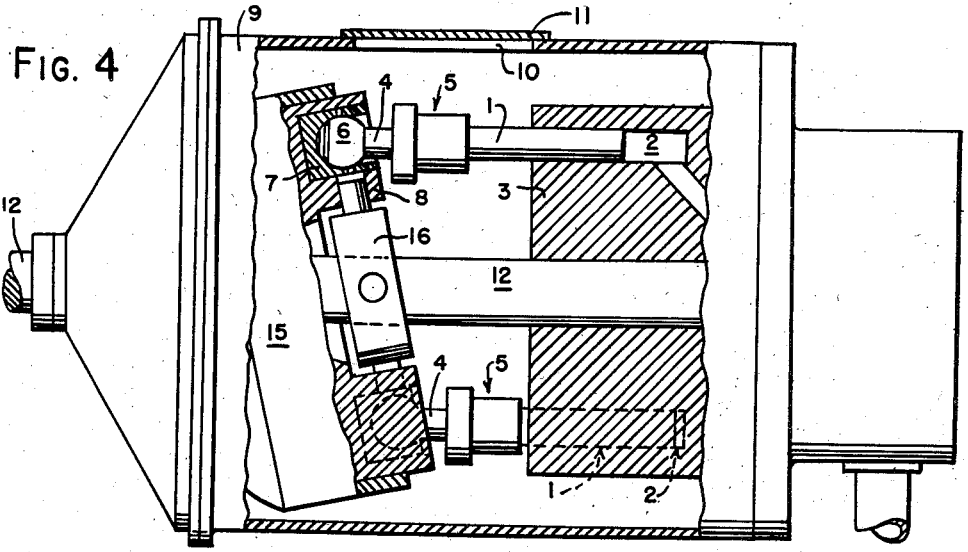
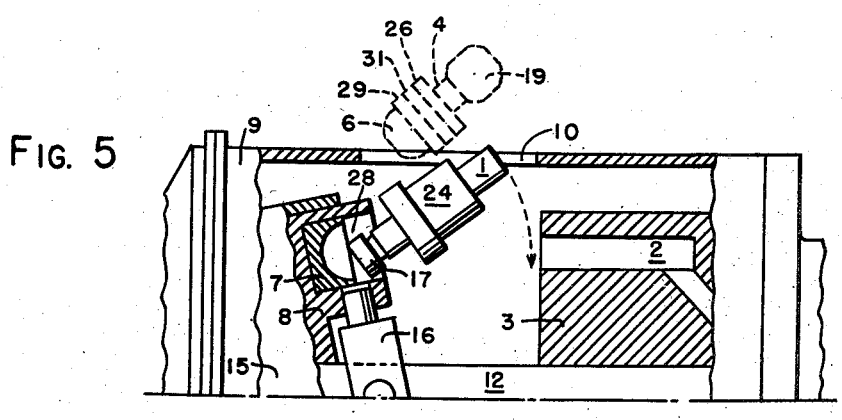
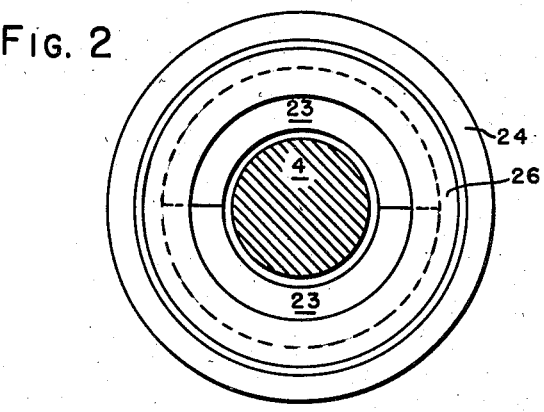
INVENTOR
WALTER FERRIS
BY
ATTORNEY

United States Patent Office 2,825,241
Patented Mar. 4, 1958

2,825,241

PISTON AND PISTON ROD ASSEMBLIES

Walter Ferris, Milwaukee, Wis., assignor to The Oilgear Company, Milwaukee, Wis., a corporation of Wisconsin Application December 31, 1952, Serial No. 329,000

13 Claims. (Cl. 74—579)

This invention relates to piston and piston rod assemblies for hydrodynamic machines of the axial type, that is, machines of the type having a plurality of pistons and cylinders arranged in a circular row with the axes of the cylinders parallel to each other, a member which is inclined to the piston axes when the machine is performing useful work and a piston rod for transmitting axial forces between each piston and the inclined member such as the piston and piston rod assemblies shown in application Serial No. 267,979 filed January 24, 1952 (now Patent No. 2,638,850) and in application Serial No. 321,476 filed November 19, 1952 of which this application is a continuation-in-part.

Piston and piston rod assemblies embodying the present invention may be incorporated in machines of the swash plate type as indicated in the accompanying drawings, or in machines of the wobble plate type such as that shown in application Serial No. 321,476, or in machines of the angle type such as that shown in Patent No. 2,661,701. A machine of any one of these types will function as a pump when driven mechanically and will function as a motor when supplied with motive liquid. Since a machine when functioning as a motor will operate oppositely to the way in which it will operate when functioning as a pump, the machine will be referred to herein as a pump but it is to be understood that the invention is equally applicable to motors and is in no way limited to pumps.

It has been common practice for many years to provide axial type pumps with piston rods each of which has one of its ends connected to the inclined member by a joint of the ball and socket type and its other end connected to a piston by a second joint of the ball and socket type which is arranged inside the piston so as to cause the radial components of the pumping forces to be landed upon the wall of the cylinder containing that piston. One of the disadvantages of such a pump is that the pump will break down in a very short time if it is employed to create high pressures because the forces which are transmitted through the piston rod are limited by the bearing value of the lubricating film between the balls and the socket of the joints and the cross-sectional area of the ball of each of the second joints is necessarily only a fraction of the cross-sectional area of the piston.

That disadvantage is overcome by the piston and piston rod assemblies shown in applications Serial No. 267,979 and Serial No. 321,476 which are entirely satisfactory when employed in certain types of pumps. However, those assemblies would be difficult to assemble in other types of pumps of very large capacity, it would be impractical to provide the piston rod of the assembly shown in application Serial No. 267,979 with an axial passage large enough to permit liquid to flow therethrough at the rate required to effect prompt operation of hydraulic devices such as the stroke changing motors of the pump shown in application Serial No. 321,476, and if the piston and piston rod assembly shown in application Serial No. 321,476 were incorporated in a pump of the swash plate type or in a pump of the angle type, the pump would be considerably larger in diameter than it would be if it were provided with piston and piston rod assemblies embodying the present invention.

An object of the invention is to provide a piston and piston rod assembly which may be made in large sizes and be readily assembled after the piston has been inserted into a cylinder of a multi-cylinder machine.

Another object is to provide a piston and piston rod assembly which is capable of transmitting very high forces and which has a relatively small outside diameter to thereby permit reduction to a minimum of the diameter of a machine which is provided with such piston and piston rod assemblies.

Other objects and advantages will appear from the following description of the embodiments of the invention shown in the accompanying drawings in which the views are as follows:

Fig. 2 is a transverse view taken on the line 2—2 of Fig. 1.

Fig. 4 is a longitudinal view, partly in full and partly in section, showing a swash plate type pump provided with piston and piston rod assemblies like that shown in Fig. 1.

Fig. 5 is a view similar to a portion of Fig. 4 and illustrating how a pump may have piston and piston rod assemblies embodying the invention assembled therein.

Figure 1:
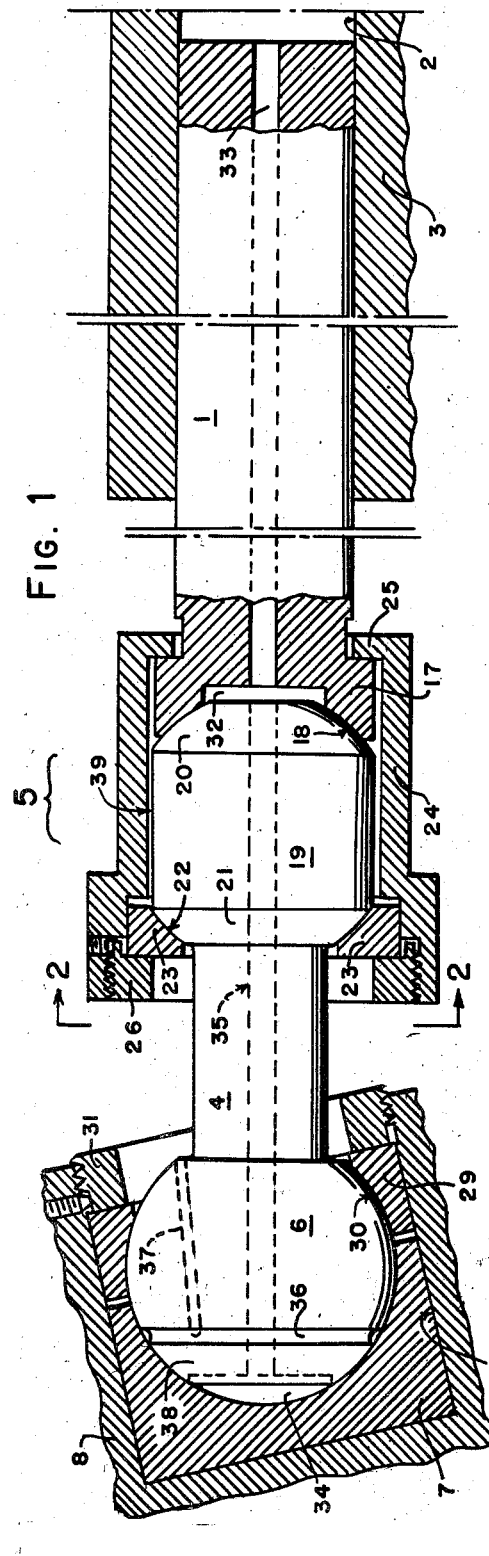
Fig. 1 is a longitudinal view, partly in full and partly in section, showing one form of the improved piston and piston rod assembly and portions of a pump in which the invention is incorporated.

The piston and piston rod assembly shown in Fig. 1 includes a piston 1 which is adapted to be fitted in a cylinder 2 formed in a cylinder block 3, a connecting rod 4, a spherical joint 5 which connects piston 1 to rod 4, and a spherical joint including a head or ball 6 on rod 4 and a socket 7 adapted to be fastened on or to a member 8 which is inclined to the axis of cylinder 2. A piston assembly embodying the invention may be incorporated in any pump in which reciprocation of the pistons is effected in response to relative rotation between a cylinder block having a plurality of pistons and cylinders arranged therein in a circular row and a thrust member which is inclined to the axis of the cylinders. Therefore, inclined member 8 may be the swash plate of a swash plate type pump, the wobble plate of a wobble plate type pump or the thrust member of an angle type pump and cylinder block 3 may be the cylinder block of any of those pumps.

For the purpose of illustration, piston and piston rod assemblies have been shown in Fig. 4 and indicated in Fig. 1 as being incorporated in a pump of the swash plate type but it is to be understood that the invention is in no way limited to that type of pump.

The pump shown in Fig. 4 has its mechanism arranged within and supported by a casing 9 having an opening or access port 10 formed in a wall thereof so that the piston assemblies may be readily incorporated in the pump, port 10 being normally closed by a removable cover plate 11. Casing 9 rotatably supports a drive shaft 12 which has cylinder block 3 fixed thereon to rotate therewith. Cylinder block 3 has a plurality of axial cylinders 2 arranged therein in a circular row concentric with shaft 12 and a piston 1 is fitted in each cylinder.

The inclined member or swash plate 8 is rotatably supported by a non-rotatable thrust member 15 which is restrained from axial movement and is inclined to the axis of shaft 12 when the pump is pumping liquid. Swash plate 8 is connected to shaft 12 by a universal joint 16 which causes it to rotate in synchronism with cylinder block 3 and in a plane which is inclined to the axes of cylinders 2 as determined by the inclination of thrust member 15. Suitable thrust bearing means (not shown) are arranged according to the usual practice between swash plate 8 and member 15 to transmit axial forces from one to the other while permitting relative rotation therebetween.

The arrangement is such that, when swash plate 8 and thrust member 15 are inclined to the axes of cylinders 2 and cylinder block 3 and swash plate 8 are rotated by shaft 12, each piston 1 will be forced progressively inward during one-half of each revolution of shaft 12 and will be drawn progressively outward during the other half of each revolution of shaft 12. The inward moving pistons will eject liquid from their cylinders and will create therein a pressure equal to the resistance encountered by the ejected liquid. The outward moving pistons will draw liquid into their cylinders if the pump is not supercharged or liquid will be forced into those cylinders at a low pressure if the pump is supercharged. Except for the piston and piston rod assemblies, the pump shown in Fig. 4 is substantially the same as the prior well-known pumps of that type. Therefore, further description of the pump is unnecessary.

Figure 3:
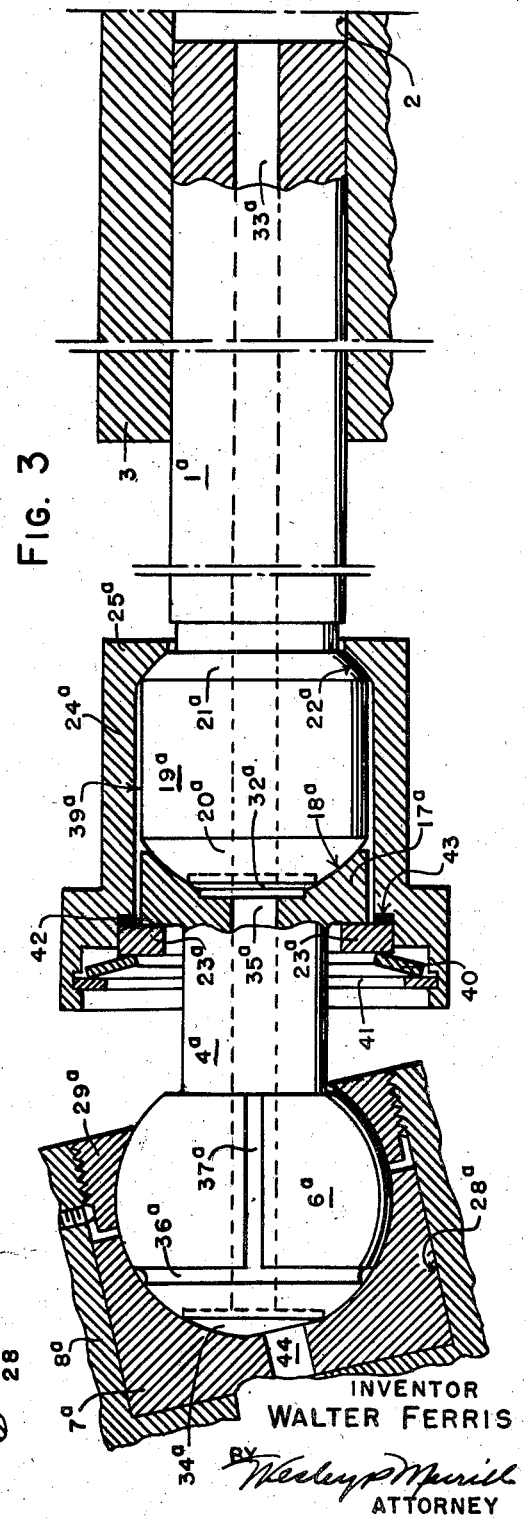
Fig. 3 is a view similar to Fig. 1 but showing the parts of one of the spherical joints reversed and different means for maintaining the parts of the joints in adjusted positions.

In Fig. 1, spherical joint 5 has been shown as including a socket 17, which is formed upon the outer end of piston 1 and has a concave spherical bearing surface 18 formed therein, and a head 19 which is formed upon the end of piston rod 4 and has a convex spherical surface 20 which is complementary to and in contact with surface 18 but the socket may be formed on the rod and the head may be formed on the piston as shown in Fig. 3.

Head 19 also has a second convex spherical surface 21 formed thereon opposite to surface 20. Surface 21 is engaged by a complementary spherical surface 22 formed upon a split ring 23 which, as shown in Fig. 2 consists of two substantially identical parts. Relative radial displacement of the two parts of ring 23 is prevented by fitting it in one end portion of a sleeve 24 which encloses socket 17 and head 19 and which has an annular flange 25 formed upon its other end to engage the annular outer face of socket 17. Split ring 23 has been shown as being held in contact with head 19 by a threaded ring or annular nut 26 which is threaded into the end of sleeve 24 but it may be held in position by other means such as a spring washer and a snap ring as shown in Fig. 3.

Socket 7 is rigidly secured to inclined member 8 such as by closely fitting it in a recess 28 which has been shown as being formed in member 8 but socket 7 may be attached to the inclined member or the ball may be attached to the inclined member and the socket formed on the piston rod as shown in application Serial No. 267,979.

Head or ball 6 has been shown in Fig. 1 as being retained in socket 7 by a cap 29 having a concave spherical surface 30 complementary to and in contact with the surface of ball 6. Cap 29 may be held in contact with ball 6 by a threaded ring or annular nut 31 threaded into the outer end of recess 28 or it may be retained in position by other means such as by threading it into socket 28 as shown in Fig. 3 or by means of a spring washer and snap ring arrangement such as that shown in Fig. 3.

In order that large axial forces may be transmitted through the spherical joints to thereby enable piston 1 to create very high pressures in cylinder 2, such as 3500 p. s. i. and higher, a hydraulic thrust bearing is incorporated in each of the joints and is connected to the cylinder so that the thrust bearings are supplied with liquid at the pressure prevailing in the cylinder. As shown, a pressure chamber 32 is arranged between socket 17 and surface 19 upon the axis of piston 1 and connected to cylinder 2 through a passage 33 which extends axially through piston 1, and a pressure chamber 34 is arranged between ball 6 and socket 7 upon the axis of rod 4 and connected to chamber 32 through a passage 35 which extends axially through rod 4.

The arrangement is such that the pressure in cylinder 2 will extend through passage 33 into chamber 32 and through passage 35 into chamber 34 and cause the liquid in those chambers to function as substantially frictionless thrust bearings through which a large part of the force required to create that pressure is transmitted.

The pressure in chambers 32 and 34 will cause liquid to seep therefrom between the adjacent spherical surfaces and form lubricating films therebetween. The liquid seeping from between socket 17 and surface 20 will pass along head 19 and form a lubricating film between spherical surfaces 21 and 22.

In order to limit the area of the lubricating film into which pressure can extend, socket 17 is made relatively short and ball 6 is provided with an annular groove 36 and with a peripheral drain groove or a drilled drain passage 37 which extends from groove 36 to a point near the body portion of rod 4. The surface of ball 6 between the adjacent edges of chamber 34 and groove 36 constitutes a bearing surface 38 because substantially all of the axial forces are transmitted through the liquid in chamber 34 and in the film between surface 38 and socket 7.

The film of liquid between surfaces 18 and 20 and the film of liquid between surface 38 and socket 7 are called "pressure films" because pressure extends from the chambers into the films. The pressure in the films at the edges of the pressure chambers is the same as the pump pressure and is zero at the outer edges of surfaces 18 and 38. The film of liquid between ball 6 and socket 7 and its cap 29 has no pressure therein beyond groove 36.

The pressure in chambers 32 and 34 and in the pressure films exerts a "blow-off force" which tends to separate socket 17 and surface 20 and to separate ball 6 and socket 7. If the mean diameter of the pressure films were too great, the blow-off forces would impose unnecessary loads upon slip ring 23 and cap 29. If the pressure chambers and the mean diameters of the pressure films were too small, a large pumping force might cause the films to break down. Therefore, since the pressure films are co-extensive with the bearing surfaces 18 and 38 respectively, the mean diameter of each of surfaces 18 and 38 is preferably nearly equal to but not larger than the piston diameter.

Joint 5 is required in order to compensate for the difference between the major and minor axes of the ellipse formed by the projection of the cylinder axes upon the inclined plane of swash plate 8. The difference between the major and minor axes of that ellipse is so small that rotation of cylinder block 3 and swash plate 8 will cause piston rod 4 to swing through a very small angle relatively to piston 1. During rotation of cylinder block 3 and swash plate 8, piston rod 4 remains nearly parallel to shaft 12 but swings through such a large angle relatively to socket 7 that nearly all of the spherical surface of ball 6 is required in order that cap 29 may retain ball 6 in socket 7.

Bearing surfaces 20 and 38, which together with the liquid in pressure chambers 32 and 34 are large enough to transmit forces high enough to create very high pressures, extend only about 52 degrees from the axis of piston rod 4. Since rod 4 swings through a very small angle relatively to piston 1, head 19 may consist of the two end portions having spherical surfaces 20 and 21 thereon and an intermediate cylindrical portion 39 having a radius about twenty-two percent less than the radius of the spherical surfaces.

A head having a cylindrical portion between the two spherical bearing surfaces has two very important advantages over a head which is spherical except for the area which joins the piston rod and possibly an area diametrically opposite the piston rod. First, the entire joint may be made considerably smaller in diameter and thereby either permit the pump to be provided with one or more additional pistons without increasing its diameter or permit the cylinders to be arranged in a smaller circle so that the diameter of the pump is smaller. Second, cap 29 and the retaining means such as ring nuts 26 and 31 may each be made in one piece and slipped over head 19 before rod 4 is connected to piston 1, thereby simplifying the construction of the piston and piston rod assembly and facilitating assembly of the parts.

Fig. 5 illustrates how a piston and piston rod assembly embodying the invention may be assembled in a pump the other parts of which have previously been assembled in the usual manner. Pistons 1 with a sleeve 24 on each may be inserted in cylinders 2 before cylinder block 3 and swash plate 8 have been moved into their proper position or assembly may be effected as follows:

Sockets 7 are preferably inserted into recesses 28 during assembly of swash plate 8. After the pump is assembled except for the pistons and piston rods, shaft 12 is rotated until a cylinder 2 is in its uppermost position. A piston 1 is lowered through port 10 until the socket 17 on that piston can be swung into the upper recess 28 as indicated in Fig. 5. Then piston 1 is swung downward and pushed into cylinder 2 until sleeve 24 abuts cylinder block 3 and socket 17 is within sleeve 24.

After piston 1 is in position, cap 29, a ring nut 31 and a ring nut 26 are slipped over head 19 onto the body portion of a piston rod 4, the internal diameter of cap 29 and of each of nuts 26 and 31 preferably being just slightly larger than the cylindrical portion 39 of head 19. Then that rod 4 is lowered through port 10, as indicated in dotted lines in Fig. 5, and ball 6 is inserted into socket 7 far enough to permit rod 4 to be swung into a horizontal position. Then cap 29 is inserted into recess 28 and nut 31 is screwed into recess 28 to hold ball 6 in socket 7.

After ball 6 is secured in socket 7, rod 4 is swung into alignment with piston 1 and sleeve 24 is pulled outward until its open end is beyond head 19. Then split ring 22 is inserted, one piece at a time, into the end of sleeve 24 and nut 26 is screwed into sleeve 24 until surface 22 is in contact with surface 21 and surface 18 is in contact with surface 20.

Nuts 26 and 31 are tightened enough to take out all end play between rod 4 and socket 7 and between rod 4 and piston 1 but not enough to prevent ball 6 from turning freely in socket 7 or to prevent head 19 from turning freely between surfaces 18 and 22. Then nuts 26 and 31 are locked in position. Thereafter, shaft 12 is rotated step by step to bring one cylinder after another to top position and the above procedure is repeated for each piston and piston rod assembly.

The piston and piston rod assembly may be modified in various ways. For example and as shown in Fig. 3, the assembly may include a piston 1ª which is adapted to be fitted in a cylinder 2 formed in a cylinder block 3 and which has a head 19ª formed upon its outer end, a piston rod 4ª which has a socket 17ª on one end thereof to engage head 19ª and a spherical head or ball 6ª on the other end thereof, a sleeve 24ª which connects piston 1ª to rod 4ª and has an annular flange 25ª formed upon one end thereof and extending radially inward and around piston 1ª, and a socket 7ª in which ball 6ª is fitted and which may be secured in a recess 28ª formed in an inclined member 8ª.

Head 19ª is very similar to head 19 and it includes two end portions having convex spherical bearing surfaces 20ª and 21ª formed thereon and an intermediate cylindrical portion 39ª having a radius considerably shorter than the radius of the bearing surfaces. Bearing surface 20ª engages a complementary bearing surface 18ª which is formed in socket 17ª, and bearing surface 21ª engages a complementary bearing surface 22ª which is formed upon the inside of flange 25ª.

Bearing surface 18ª is held in contact with bearing surface 20ª and bearing surface 21ª is held in contact with bearing surface 22ª by a split ring 23ª consisting of two identical parts separation of which is prevented by fitting the ring in an end portion of sleeve 24ª. Ring 23ª may be held against the flat annular outer face of socket 17ª by a ring nut 26 which is threaded into the end of the sleeve as shown in Fig. 1 but for the purpose of illustration it has been shown as being urged against the annular outer face of socket 17ª by a spring washer 40 arranged between ring 23ª and a snap ring 41 which is inserted into a suitable annular groove formed in the inner wall of sleeve 24ª. The force exerted by spring washer 40 is prevented from being transmitted to head 19ª by suitable shims 42 which are arranged between split ring 23ª and an annular shoulder 43 formed in the inner wall of sleeve 24ª.

Ball 6ª is held in contact with socket 7ª by a cap 29ª which is threaded into recess 28ª just far enough to prevent any end play between rod 4ª and socket 7ª while permitting ball 6ª to turn freely in socket 7ª. The internal diameters of cap 29ª and spring washer 40 are just slightly larger than the outside diameter of socket 17ª so that cap 29ª and washer 40 can be slipped over socket 17ª before piston 1ª is connected to rod 4ª.

In order that a large part of the pumping force may be transmitted through hydraulic thrust bearings, a pressure chamber 32ª is formed between head 19ª and socket 17ª upon the axis of piston 1ª and is connected to cylinder 2 through a passage 33ª which extends through piston 1ª, and a pressure chamber 34ª is arranged between ball 6ª and socket 7ª upon the axis of rod 4ª and is connected to chamber 32ª by a passage 35ª which extends through rod 4ª.

The pressure in chambers 32ª and 34ª causes liquid to seep therefrom and to form lubricating films between the spherical bearing surfaces. The areas of the film into which pressure can extend is limited by making socket 17ª relatively short and by providing ball 6ª with a limit groove 36ª and a drain groove 37ª as explained in connection with the description of the assembly shown in Fig. 1.

If it is desired to operate hydraulic devices with liquid supplied thereto through the piston assemblies as is the case in the pump shown in application Serial No. 321,476, the axial passage in the piston and the rod may be made as large as necessary and the pressure chamber between the ball and the socket which is carried by the inclined member may be connected to those devices as indicated in Fig. 3 in which passages 33ª and 35ª have been shown as being of substantial size and socket 7ª and inclined member 8ª have been shown provided with a passage 44 which communicates with pressure chamber 34ª and to which such hydraulic devices may be connected.

The piston and piston rod assembly shown in Fig. 3 is functionally the same as that shown in Fig. 1 and it may be assembled in the above described manner.

The invention may be embodied in other forms and modified in various ways without departing from the scope of the invention which is hereby claimed as follows:

1. A joint, for connecting a piston rod to a piston of an axial type hydrodynamic machine, comprising a head part and a socket part one of which is fixed to said rod and the other of which is fixed to said piston, said head part including a cylindrical portion having a radius at least as great as the radius of said piston and a convex spherical bearing surface arranged at one end of said cylindrical portion and having a radius greater than the radius of said cylindrical portion, said socket part having a concave spherical bearing surface which is complementary to and in contact with said convex bearing surface, and means for maintaining said bearing surfaces in contact with each other.

2. A device, for transmitting forces between the thrust member and a piston of an axial type hydrodynamic machine, comprising a piston rod having upon one end thereof a first joint which includes a socket and an interfitting ball, a second joint for connecting the other end of said rod to a piston and including a head part and a socket part one of which is fixed to said rod and the other of which is fixed to said piston, said head part including a cylindrical portion having a radius at least as great as the radius of said piston and a convex spherical bearing surface arranged at one end of said cylindrical portion and having a radius greater than the radius of said cylindrical portion, said socket part having a concave spherical bearing surface which is complementary to and in contact with said convex bearing surface, means for maintaining said bearing surfaces in contact with each other, and means for lubricating said joints and for providing liquid thrust bearings between said ball and said socket and between said head part and said socket part including a first recess formed between said ball and said socket upon the axis of said rod, a second recess formed between said head part and said socket part upon the axis of said piston, an axial passage extending completely through said piston for conducting liquid from the cylinder containing said piston to said second recess, and a second axial passage extending through said rod for conducting liquid from said second recess to said first recess.

3. A joint, for connecting a piston rod to a piston of an axial type hydrodynamic machine, comprising a head part and a socket part one of which is fixed to said rod and the other of which is fixed to said piston, said head part including two end portions having two concentric convex spherical surfaces formed thereon respectively and an intermediate cylindrical portion having a radius considerably smaller than the radius of said spherical surfaces, said socket part having a concave spherical surface which is complementary to and in contact with one of said convex spherical surfaces, an element having a concave spherical surface complementary to and in contact with the other of said convex spherical surfaces, a sleeve for enclosing said head part and said socket part, and means including said sleeve for holding said concave spherical surfaces in contact with said convex spherical surfaces respectively.

4. A combination as set forth in claim 3 in which said holding means is a ring which engages said collar and is threaded into one end of said sleeve and which has an internal diameter greater than the diameter of said cylindrical portion.

5. A combination as set forth in claim 3 in which said sleeve has an internal annular groove formed therein near one end thereof, a split collar arranged in said sleeve inward from said groove, a snap ring is arranged in said groove, and a spring washer having an internal diameter greater than the diameter of said cylindrical portion is arranged between said split collar and said snap ring.

6. A device, for transmitting forces between the thrust member and a piston of an axial type hydrodynamic machine, comprising a piston rod having upon one end thereof a first joint which includes a socket and an interfitting ball, a second joint for connecting the other end of said rod to a piston and including a head part and a socket part one of which is fixed to said rod and the other of which is fixed to said piston, said head part including two end portions having two concentric convex spherical surfaces formed thereon respectively and an intermediate cylindrical portion having a radius considerably smaller than the radius of said spherical surfaces, said socket part having a concave spherical surface which is complementary to and in contact with one of said convex spherical surfaces, an element having a concave spherical surface complementary to and in contact with the other of said convex spherical surfaces, a sleeve for enclosing said head part and said socket part, means including said sleeve for holding said concave spherical surfaces in contact with said convex spherical surfaces respectively and also including a split ring arranged within an end portion of said sleeve and an annular retaining member for holding said split ring in position and having an internal diameter larger than the external diameter of said cylindrical portion, and means for lubricating said joints and for providing liquid thrust bearings between said ball and said socket and between said head part and said socket part including a first recess formed between said ball and said socket upon the axis of said rod, a second recess formed between said head part and said socket part upon the axis of said piston, an axial passage extending completely through said piston for conducting liquid from the cylinder containing said piston to said second recess, and a second axial passage extending through said rod for conducting liquid from said second recess to said first recess.

7. A joint, for connecting a piston rod to a piston of an axial type hydrodynamic machine, comprising a head part which is fixed to said rod and a socket part which is fixed to said piston, said head part including a cylindrical portion having a radius at least as great as the radius of said piston and a convex spherical bearing surface arranged at one end of said cylindrical portion and having a radius greater than the radius of said cylindrical portion, said socket part having a concave spherical bearing surface which is complementary to and in contact with said convex bearing surface, and means for maintaining said bearing surfaces in contact with each other.

8. A device, for transmitting forces between the thrust member and a piston of an axial type hydrodynamic machine, comprising a piston rod having upon one end thereof a first joint which includes a socket and an interfitting ball, a second joint for connecting the other end of said rod to a piston and including a head part which is fixed to said rod and a socket part which is fixed to said piston, said head part including a cylindrical portion having a radius at least as great as the radius of said piston and a convex spherical bearing surface arranged at one end of said cylindrical portion and having a radius greater than the radius of said cylindrical portion, said socket part having a concave spherical bearing surface which is complementary to and in contact with said convex bearing surface, means for maintaining said bearing surfaces in contact with each other, and means for lubricating said joints and for providing liquid thrust bearings between said ball and said socket and between said head part and said socket part including a first recess formed between said ball and said socket upon the axis of said rod, a second recess formed between said head part and said socket part upon the axis of said piston, an axial passage extending completely through said piston for conducting liquid from the cylinder containing said piston to said second recess, and a second axial passage extending through said rod for conducting liquid from said second recess to said first recess.

9. A joint, for connecting a piston rod to a piston of an axial type hydrodynamic machine, comprising a head part which is fixed to said rod and a socket part which is fixed to said piston, said head part including a cylindrical portion having a radius at least as great as the radius of said piston and a convex spherical bearing surface arranged at one end of said cylindrical portion and having a radius greater than the radius of said cylindrical portion, said socket part having a concave spherical bearing surface which is complementary to and in contact with said convex bearing surface, a sleeve enclosing said head part and said socket part and having at one end thereof a flange to engage the surface of said socket part opposite said concave spherical surface, a convex spherical retraction surface formed upon the other end of said cylindrical portion, a split collar arranged in the other end of said sleeve and having formed thereon a concave spherical retraction surface complementary to and in contact with said convex retraction surface, and means engaging said collar and coacting with said sleeve for holding said retraction surfaces in contact with each other and for holding said bearing surfaces in contact with each other.

10. A combination as set forth in claim 9 in which said holding means is a ring which engages said collar and is threaded into one end of said sleeve and which has an internal diameter greater than the diameter of said cylindrical portion.

11. A joint, for connecting a piston rod to a piston of an axial type hydrodynamic machine, comprising a head part which is fixed to said piston and a socket part which is fixed to said rod, said head part including a cylindrical portion having a radius at least as great as the radius of said piston and a convex spherical bearing surface arranged at one end of said cylindrical portion and having a radius greater than the radius of said cylindrical portion, said socket part having a concave spherical bearing surface which is complementary to and in contact with said convex bearing surface, and means for maintaining said bearing surfaces in contact with each other.

12. A device, for transmitting forces between the thrust member and a piston of an axial type hydrodynamic machine, comprising a piston rod having upon one end thereof a first joint which includes a socket and an interfitting ball, a second joint for connecting the other end of said rod to a piston and including a head part which is fixed to said piston and a socket part which is fixed to said rod, said head part including a cylindrical portion having a radius at least as great as the radius of said piston and a convex spherical bearing surface arranged at one end of said cylindrical portion and having a radius greater than the radius of said cylindrical portion, said socket part having a concave spherical bearing surface which is complementary to and in contact with said convex bearing surface, means for maintaining said bearing surfaces in contact with each other, and means for lubricating said joints and for providing liquid thrust bearings between said ball and said socket and between said head part and said socket part including a first recess formed between said ball and said socket upon the axis of said rod, a second recess formed between said head part and said socket part upon the axis of said piston, an axial passage extending completely through said piston for conducting liquid from the cylinder containing said piston to said second recess, and a second axial passage extending through said rod for conducting liquid from said second recess to said first recess.

13. A joint, for connecting a piston rod to a piston of an axial type hydrodynamic machine, comprising a head part which is fixed to said piston and a socket part which is fixed to said rod, said head part including a cylindrical portion having a radius at least as great as the radius of said piston and a convex spherical bearing surface arranged at one end of said cylindrical portion and having a radius greater than the radius of said cylindrical portion, said socket part having a concave spherical bearing surface which is complementary to and in contact with said convex bearing surface, a convex spherical retraction surface formed at the other end of said cylindrical portion, a sleeve enclosing said head part and said socket part and having at one end thereof a concave spherical retraction surface complementary to and engaging said convex retraction surface, a split collar arranged in the other end of said sleeve and engaging said socket part, and means engaging said collar and coacting with said sleeve for holding said retraction surfaces in contact with each other and for holding said bearing surfaces in contact with each other.

References Cited in the file of this patent

UNITED STATES PATENTS

| | | |
|---|---|---|
| 1,204,892 | Macomber | Nov. 14, 1916 |
| 1,811,736 | Van Bezel | June 23, 1931 |
| 1,817,063 | Carrie | Aug. 4, 1931 |
| 1,829,964 | Randall | Nov. 3, 1931 |
| 2,182,601 | Venditty | Dec. 5, 1939 |
| 2,365,309 | Talbot | Dec. 19, 1944 |
| 2,383,394 | Kindervater | Aug. 21, 1945 |